United States Patent
Doane (10) Patent No.: US 7,024,309 B2
(45) Date of Patent: Apr. 4, 2006

(54) AUTONOMOUS STATION KEEPING SYSTEM FOR FORMATION FLIGHT

(75) Inventor: Paul M. Doane, Manchester, MO (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 74 days.

(21) Appl. No.: 10/650,606

(22) Filed: Aug. 28, 2003

(65) Prior Publication Data

US 2005/0055143 A1 Mar. 10, 2005

(51) Int. Cl.
*G01S 13/93* (2006.01)

(52) U.S. Cl. .......................... 701/301; 701/3; 701/120; 342/29; 342/30

(58) Field of Classification Search .............. 701/3, 701/120, 301; 342/29, 30, 31, 32; 340/961
See application file for complete search history.

(56) References Cited

U.S. PATENT DOCUMENTS

| 6,262,679 | B1 | * | 7/2001 | Tran | 342/29 |
| 6,271,768 | B1 | * | 8/2001 | Frazier et al. | 340/961 |
| 6,278,396 | B1 | * | 8/2001 | Tran | 342/29 |
| 6,459,411 | B1 | * | 10/2002 | Frazier et al. | 342/455 |
| 6,483,454 | B1 | * | 11/2002 | Torre et al. | 342/30 |
| 6,531,978 | B1 | * | 3/2003 | Tran | 342/29 |
| 6,646,588 | B1 | * | 11/2003 | Tran | 342/29 |
| 2002/0154061 | A1 | * | 10/2002 | Frazier et al. | 342/455 |
| 2003/0014165 | A1 | * | 1/2003 | Baker et al. | 701/3 |
| 2003/0137444 | A1 | * | 7/2003 | Stone et al. | 342/30 |
| 2003/0233192 | A1 | * | 12/2003 | Bayh et al. | 701/301 |

* cited by examiner

*Primary Examiner*—Gary Chin (57) ABSTRACT

A system for autonomously keeping an aircraft's station in a formation flight of a plurality of aircraft includes a navigation system configured to determine a position of an aircraft. A data link is configured to allow the aircraft to communicate data with at least one other aircraft in the formation flight of the plurality of aircraft. A sensor is configured to detect a presence of another aircraft within a predetermined distance of the aircraft. A processor is configured to provide control signals to the aircraft's autoflight system to keep the aircraft at a predetermined station relative to the other of the plurality of aircraft in the formation flight.

60 Claims, 3 Drawing Sheets

AUTONOMOUS STATION KEEPING SYSTEM FOR FORMATION FLIGHT

GOVERNMENT LICENSE RIGHTS

This invention was made with Government support under U.S. Government contract F33615-01-2-3101 awarded by the U.S. Air Force. The Government has certain rights in this invention.

FIELD OF THE INVENTION

The present invention relates generally to avionics and, specifically to formation station keeping avionics.

BACKGROUND OF THE INVENTION

Aircraft frequently fly in formation. Each aircraft in a formation flight occupies and maintains a position relative to each other aircraft in the formation. Such a relative position is referred to as a station, and maintaining that relative position is referred to as station keeping.

Formations may be flown by a variety of aircraft for a number of reasons. For example, civil aircraft may be flown in formation as part of flying club activities. As a further example, civil and military aerobatics teams, such as the U.S. Navy Flight Demonstration Squadron (well known the world over as "The Blue Angels") perform aerobatics maneuvers in formation. In the example of The Blue Angels, high-performance tactical aircraft, such as the F/A-18 Hornet manufactured by The Boeing Company, are flown at speeds in excess of 500 knots in formations with as little as eighteen inches of separation between a wingtip of one plane and the helmet of the pilot of an adjacent plane in the formation.

In the above examples, station keeping is performed visually. As a result, formation flights and aerobatic shows are limited to visual flight rules (VFR) conditions.

Advances in avionics have resulted in development of avionics systems that autonomously perform station keeping for formation flights that entail larger separations than the miniscule separation precisely maintained by The U.S. Navy Blue Angels. For example, the C-17 Globemaster III transport, manufactured by The Boeing Company and flown by the U.S. Air Force, currently employs an avionics system to allow C-17 Globemaster III aircraft to fly autonomously in formation.

In response to operational commitments, it may be desirable to fly aircraft, such as the C-17 Globemaster III transport, in formation in other-than-VFR conditions, such as Instrument Flight Rules (IFR) conditions due to low visibility or other weather-related conditions. Currently known systems adequately perform autonomous station keeping functions for formation flights of C-17 Globemaster III transports in VFR conditions. However, operational experience has indicated that improvements are desirable for autonomous station-keeping in low visibility conditions.

Therefore, there is an unmet need in the art for a system that autonomously performs station keeping functions for formation flights—even in low visibility conditions.

SUMMARY OF THE INVENTION

The present invention provides a system to allow a group of aircraft to autonomously fly in formation in all flight conditions, including low visibility conditions. Embodiments of the present invention advantageously may enable a group of aircraft to fly safely within 1000 feet of each other, even in zero visibility conditions. As a result, collisions can be avoided, thereby increasing flight safety. Further, operational capability and flexibility may be embedded by permitting formations to be flown in conditions that previously precluded formation flights.

According to an exemplary embodiment of the present invention, a system for autonomously keeping an aircraft's station in a formation flight of a plurality of aircraft includes a navigation system configured to determine a position of an aircraft. A data link is configured to allow the aircraft to communicate data with one or more other aircraft in the formation flight of the plurality of aircraft. A sensor is configured to detect a presence of another aircraft within a predetermined distance of the aircraft. A processor is configured to provide control signals to the aircraft's autoflight system to keep the aircraft at a predetermined station relative to the other of the plurality of aircraft in the formation flight.

According to an aspect of the present invention, the navigation system may include an Embedded Global Positioning System/Inertial Navigation System (EGI).

According to another aspect of the present invention, the data link may include a Link 16 data link, an ARC 210 data link, or a Multifunction Airborne Data Link (MADL), a Tactical Targeting Network Technology (TTNT) data link, or any other data link suitable to this application.

According to a further aspect of the present invention, the sensor may include an on-board millimeter wave radar system, such as MADL (which can function as a data link or sensor) or a laser or optical sensor, or any other sensor to locate the position of a neighboring aircraft.

According to further aspects of the present invention, the processor may include a first component that is configured to generate first control signals for performing a collision avoidance maneuver when the aircraft is within a first predetermined threshold from the other aircraft in the formation. The processor may also include a second component that is configured to generate second control signals for performing a collision deconfliction maneuver when the position of the aircraft is within a second predetermined threshold from the other aircraft in the formation, the second predetermined threshold being greater than the first predetermined threshold.

The first and second predetermined thresholds may be time or distance thresholds, as desired for a particular application. For example, distance thresholds may be used for avoiding collisions or deconflicting collisions with aircraft that are flying in the formation. Alternately, time thresholds may be used for avoiding collisions or deconflicting collisions with aircraft that are not flying in the formation.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
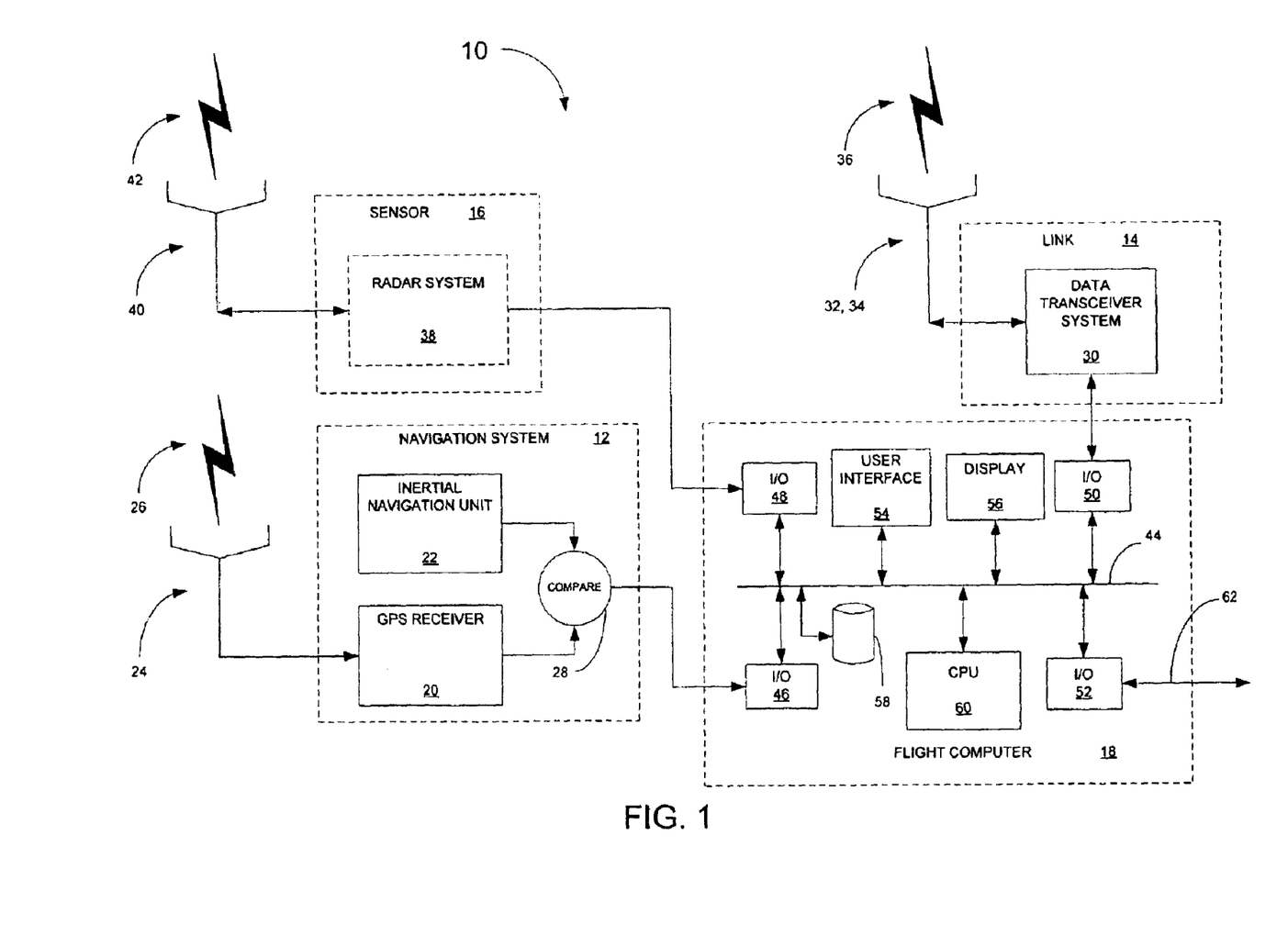
FIG. 1 is a block diagram of an exemplary system according to an embodiment of the present invention.

By way of overview and referring to FIG. 1, according to a non-limiting embodiment of the present invention, an autonomous station keeping system 10 is provided to allow a plurality of aircraft (not shown) to autonomously fly in a formation flight, even in low visibility conditions. Advantageously, the system 10 autonomously keeps an aircraft's station in the formation flight. The system 10 includes a navigation system 12 configured to determine a position of the aircraft. A data link 14 is configured to allow the aircraft to communicate data with at least one other aircraft in the formation flight. A sensor 16 is configured to sense position of other aircraft within a predetermined distance of the aircraft. A processor 18 is configured to provide control signals to the aircraft's autoflight system to keep the aircraft at a predetermined station relative to the other of the plurality of aircraft in the formation flight. The processor may include a first component that is configured to generate first control signals for performing a collision avoidance maneuver when the position of the aircraft is within a first predetermined threshold from the other aircraft in the formation. The processor may also include a second component that is configured to generate second control signals for performing a collision deconfliction maneuver when the position of the aircraft is within a second predetermined threshold from the other aircraft in the formation, the second predetermined threshold being greater than the first predetermined threshold. Details of an exemplary embodiment will be set forth below.

The navigation system 12 determines position of the aircraft. In one exemplary embodiment, the navigation system 12 suitably is an embedded Global Positioning System (GPS) inertial navigation system (EGI). The EGI 12 includes a GPS receiver 20 that is integrated into an inertial navigation system 22. A GPS satellite receive antenna 24 receives a GPS satellite signal 26 in a known manner and provides an output signal to the GPS receiver 20. The receive antenna 24 may be any acceptable satellite receive antenna that is configured to receive the GPS satellite signals 26 and that is mountable on an aircraft. The receive antenna 24 may be mechanically or electronically steered, as desired, to maintain track on a GPS satellite (not shown) being tracked. GPS receivers are well known in the art, and a detailed explanation of their construction and operation is not necessary for an understanding of the present invention. Any of several suitable commercially-available GPS receivers may be used as desired for a particular application, such as without limitation a Trimble Force 5 GRAM-S GPS receiver.

The inertial navigation system 22 may be any well known inertial navigation system configured for use aboard aircraft. Inertial navigation systems for aircraft are well known in the art, and a detailed explanation of their construction and operation is not necessary for an understanding of the present invention. Any of several suitable commercially-available inertial navigation systems may be used as desired for a particular application, such as without limitation a Honeywell H-764G navigation system.

The GPS receiver 20 can be, but is not required to be integrated into the inertial navigation system 22. Output signals from the GPS receiver 20 and the inertial navigation system 22 are input to a comparison and position updating circuit 28 that corrects the inertial navigation system error in a known manner.

The EGI 12 suitably provides an aircraft with its location in an earth-based coordinate system with a three-sigma uncertainty of around ±30 meters. This uncertainty can be reduced to ±1 meter if access is obtained to government-restricted GPS functions. Jamming of the GPS signal 26 may increase the positional uncertainty over time due to inertial system drift. However, this impact is minimal unless the GPS satellite signal 26 is lost for extended periods, such as around 20 minutes or more. EGI systems are well known in the art, and a detailed explanation of their construction and operation is not necessary for an understanding of the present invention. Any of several suitable commercially-available EGI systems may be used as desired for a particular application, such as a Trimble ACE III GPS receiver.

In one embodiment, GPS uncertainty advantageously may be reduced to nominally around ±1 meter. In this embodiment, the GPS satellite signal 26 is a precision PY GPS signal that is currently emitted by all GPS satellites. In addition, Selective Availability Anti Spoof Module (SAASM) technology in development may provide increased robustness to GPS jamming, when available. The SAASM technology is being developed and is expected be available in a 24 channel (that is, full GPS redundancy), precision GPS receiver integrated with an inertial navigation unit. Such a system, when available, would replace currently-existing EGIs to provide significantly improved accuracy and robustness to GPS jamming.

The data link 14 is configured to allow the aircraft to communicate data with at least one other aircraft in the formation flight. The data link 14 includes a data transceiver system 30. A transmit antenna 32 and a receive antenna 34 transmit and receive a data signal 36 in a known manner and are coupled to the data transceiver system 30. As is known, the transmit antenna 32 and the receive antenna 34 may be separate antennas or may share a same aperture. The antennas 32 and 34 suitably are any acceptable antennas that are configured to transmit and receive, respectively, the data signal 36 and that are mountable on an aircraft.

Many data links advantageously support the system 10. Three presently preferred links are set forth below.

A first preferred data link 14 is Link 16. Link 16 offers several advantages. First, Link 16 advantageously is being installed on military aircraft for improved situation awareness. Second, Link 16 presents a low probability of intercept because it uses spread sprectrum technology. Moreover, Link 16 transmits heading and GPS location about every 3 seconds, which is typically sufficient for station keeping purposes. In the event this periodicity is not sufficient for station keeping, Link 16 has a "layered network" capability in which a small group of aircraft periodically can communicate more frequently.

A second preferred data link 14 is an ARC 210 link, such as a Rockwell Collins Warrior 1851 ARC 210 data link. Advantageously, the Warrior 1851 data link is a form, fit, and function (F3) replacement for existing ultra high frequency (UHF) radios, such as a Rockwell Collins 1794(C) UHF radio. Consequently, an ARC 210 link advantageously could be integrated into the aircraft as a plug-and-play replacement of an existing 1794(C) UHF radio, thereby minimizing retrofit costs.

A third preferred data link 14 is a Multifunction Airborne Data Link (MADL). MADL is a millimeter wave (MMW) radar that is being developed by the Harris Corporation. Advantageously, MADL has a low cost and is small (approximately 4"×6" aperture). Six MADLs provide full four pi coverage around the aircraft. This allows the aircraft to detect any aircraft within around 10 miles. MADL is a very high bandwidth, steerable data link on the order of around 1.5 megabyte per second for line-of-sight applications. A high frequency (around 20 GHz) and low power (around 5 watts) afford MADL a very low probability of detection and interception. As a result, MADL is a preferred data Link 14 for station keeping purposes. However, final selection of the data link 14 for a particular application may be made based upon a balance of benefits, performance, cost, and integration feasibility.

Alternately, a Tactical Targeting Network Technology (TTNT) data link or any other suitable data link may be used as desired for a particular application.

The sensor 16 is configured to detect a presence of another aircraft within a predetermined distance of the aircraft. Advantageously, the system 10 may use an existing on-board sensor as the sensor 16. That is, a stand-alone sensor need not be added to the aircraft if an acceptable sensor is already installed on the aircraft. For example, in one preferred embodiment, the sensor 16 suitably is a MADL MMW radar. Use of the MADL MMW radar enables the system 10 to detect presence of other aircraft within a distance of around 10 miles or so. In one embodiment, the MADL advantageously is the same MADL system that is used for the data link 14. The antennas 32 and 34 transmit and receive, respectively, the signal 36. When the MADL MMW is used as the sensor 16, the signal 36 is used to detect presence of other aircraft. Time-sharing of the MADL is controlled by the processor 18 and will be discussed below.

If desired, output the MADL MMW may fused with other sources of contact information, such as a primary forward-looking radar system 38, to create an integrated situation awareness for evaluation by the processor 18. In this embodiment, a radar antenna 40 having transmit and receive apertures transmit and receive a radar signal 42 in a known manner and are coupled to the radar system 38. The radar antenna 40 suitably is any acceptable antenna that is configured to transmit and receive the radar signal 42 and that is mountable on or within an aircraft.

In another embodiment, the sensor 16 may be a stand-alone sensor. Given by way of nonlimiting example, the sensor 16 may include the radar system 38 described above. In this case, the radar system 38 transmits and receives the radar signal 42 via the radar antenna 40. Output of the radar system 38 is provided to the processor 18 as the only situation awareness input to the processor 18. Alternately, any other suitable stand-alone sensor may used as desired to provide sensor input regarding location of other aircraft to the processor 18. Given by way of non-limiting example, the sensor 16 may include without limitation an optical sensor, such as a laser, a light detection and ranging (LIDAR) system, or the like.

The processor 18 controls the system 10. The processor 18 suitably is any acceptable flight computer that is known in the art and that is configured to perform calculations for controlling flight parameters. Given by way of nonlimiting example, a suitable flight computer that may be used as the processor 18 includes the Rockwell Collins EDFCS-730 Enhanced Digital Flight Control System.

Components of the processor 18 will be discussed below briefly. Because components of the processor 18 are well known, a detailed discussion of their construction or operation is not necessary for an understanding of the invention. The processor 18 includes a system bus 44. Input/output interface devices 46, 48, 50, and 52 are coupled to exchange data between the system bus 44 and the navigation system 12, the sensor 16, the data link 14, and the aircraft's autoflight system (not shown), respectively. A user interface 54 is coupled to the system bus 44 to enable a user to enter data and make selections as desired. The user interface 54 suitably is any acceptable user interface configured for use aboard an aircraft. Given by way of nonlimiting example, the user interface 54 may include a keypad, a touchscreen, a trackball, a mouse, a keyboard, or the like. A display device 56 is coupled to the system bus 44 to enable the user to view desired flight parameters, information, warnings, or the like. The display device 56 suitably is any acceptable display device, such as a cathode ray tube, a liquid crystal display, a plasma display, or the like. If desired, the user interface 54 may be incorporated with the display device 56. For example, a screen of the display device 56 may also function as a touchscreen for the user interface 54.

A memory device 58 is coupled to the system bus 44. The memory device 58 suitably is any volatile or nonvolatile memory device, and may include any type of read-only memory (ROM), random access memory (RAM), flash memory, or storage device such as optical or magnetic storage devices or media such as disc drives, compact disc, digital video disc, or the like. Without limitation, the memory device 58 suitably stores for retrieval data, such as flight plans of other aircraft that are received via the data link 14 and the flight plan for the aircraft and computer software programs that are executed by the processor 18.

A central processing unit (CPU) 60 is coupled to the system bus 44. The CPU executes algorithms resident in the memory 58 for autonomously keeping the station of the aircraft, for performing collision deconfliction, and for performing collision avoidance based on data from the navigation system 12, the data link 14, and the sensor 16, and retrieved data from the memory 58 such as the aircraft's flight plan, as discussed below. The CPU generates control signals 62 for performing station keeping, collision deconfliction, or collision avoidance, as the case may be. The control signals 62 are provided to the aircraft's autoflight system (not shown) via the input/output interface device 52. The CPU 60 suitably is any CPU configured to perform calculations and execute algorithms for managing and controlling flight parameters. CPUs that are included with flight computers are well known in the art, and a discussion of their construction and operation is not necessary for an understanding of the present invention.

Figure 2:
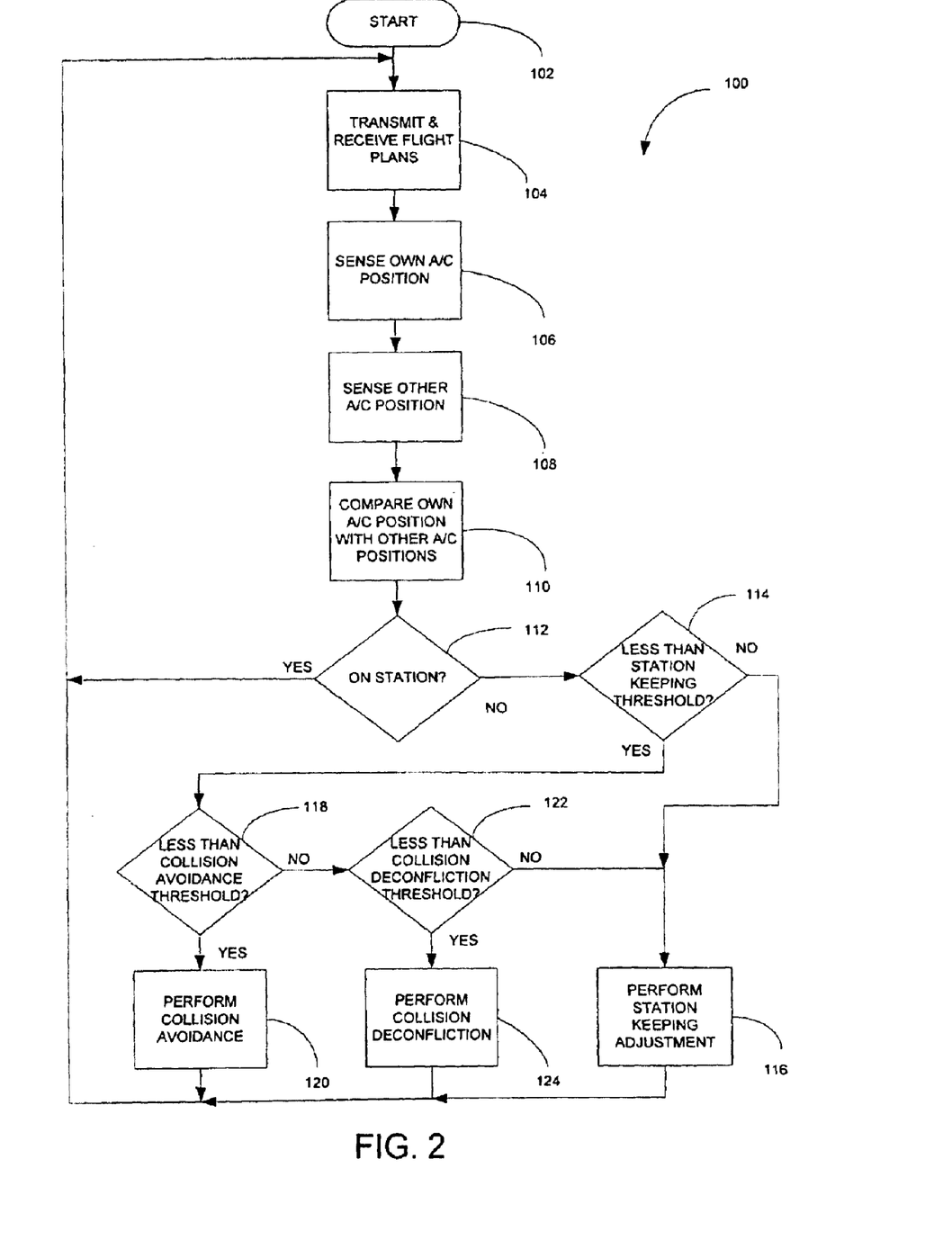
FIG. 2 is a flow chart of a routine performed by the exemplary system of FIG. 1.

Now that an exemplary embodiment of the system 10 has been set forth, referring now to FIG. 2 an exemplary routine 100 performed according to an embodiment of the invention will be explained. Explanation of the routine 100 will make reference to components of the system 10 (FIG. 1).

The routine 100 starts at a block 102. At a block 104 the flight plan of the aircraft is retrieved from the memory 58 and is transmitted by the data link 14. As a result, other aircraft in the formation are appraised of intended position and maneuvers of the aircraft. Also, flight plans of the other aircraft in the formation are received via the data link 14 and are stored in the memory 58. Advantageously, this permits coordination of maneuvers, such as turns, among the aircraft flying in the formation. For example, upon execution of a planned maneuver, another aircraft may momentarily come within a distance of the aircraft that would otherwise trigger a collision deconfliction maneuver (discussed below). However, according to the flight plans, the other aircraft would quickly be at a safe distance from the aircraft. Because in this example the incursion by the other aircraft is determined to be momentary, the collision deconfliction maneuver is not performed by the aircraft. At a block 106 the navigation system 12 senses position of the aircraft. The position of the aircraft is sensed in an earth-centric coordinate system and is determined in terms of latitude, longitude, and altitude. Output of the navigation system 12 is provided to the processor 18 via the input/output interface device 46.

At a block 108 the sensor 16 senses position of other aircraft. The position of the other aircraft is sensed in a reference frame centered about the aircraft and is determined in terms of distance, azimuth, and elevation. Output of the sensor 16 is provided to the processor 18 via the input/output interface device 48.

At a block 110 the processor 18 compares the position of the aircraft with the position of other aircraft. The reference frames of the aircraft, the other aircraft, and the flight plans are harmonized into a same reference frame so the desired positions set forth in the flight plan (and the relative positions derived therefrom) can be used as a guide to determine if actual, sensed positions coincide with the desired positions. At a decision block 112, a determination is made whether or not the aircraft is on station. A determination of "on station" means that the neighboring aircraft are in the proper position relative to the host aircraft. If it is determined that the aircraft is on station, then the routine 100 returns to the block 104.

If it is determined that the aircraft is not on station, then actions are taken to return the aircraft onto its station, to avoid a collision, or to deconflict a collision. To that end, a determination is made at a decision block 114 if the aircraft is at a threshold from the other aircraft that is less than a predetermined station keeping threshold. The threshold may be determined in terms of distance from other aircraft in the formation. That is, it is determined if the aircraft is off-station because the aircraft is too close (relative to the station of the aircraft) to the other aircraft or if the aircraft is off-station because it is too far away (relative to the station of the aircraft) from the other aircraft. It will be appreciated that the predetermined station keeping distance may be selected as desired for a particular formation and is determined by the flight plans, or mission requirements, or the like. For example, given by way of nonlimiting example, the predetermined station keeping distance may be as little as around 800 feet from other aircraft in the formation (measured wingtip-to-wingtip) for a troop deployment mission or as much as around 10,000 feet from other aircraft in the formation (measured wingtip-to-wingtip) for a mission that is not tightly coordinated, such as a penetration mission or the like.

If at the decision block 114 the aircraft is determined to be off-station because the aircraft is greater than the predetermined station keeping threshold, then at a block 116 station keeping adjustment is performed to bring the aircraft back onto its station. The processor 18 determines any course, speed, and/or altitude adjustments for returning position of the aircraft from its sensed, actual position to its desired station in the formation. The processor 18 communicates the control signals 62 to the aircraft's autoflight system for processing and translation into surface deflection commands or throttle lever position commands, as desired.

If at the decision block 114 the aircraft is determined to be off-station because the aircraft is less than the predetermined station keeping threshold, then further determinations are performed regarding collision avoidance and deconfliction. At a decision block 118 a determination is made if the aircraft is at a threshold from the other aircraft that is less than a collision avoidance threshold. The collision avoidance threshold may be expressed in terms of time or distance, depending on whether the collision to be avoided is with an aircraft that is flying within the formation or is flying outside the formation.

For aircraft flying in the formation, the collision avoidance threshold suitably is measured in terms of distance. This is because the processor 18 is aware of the flight plan(s) of other aircraft in the formation and because all the aircraft in the formation are generally flying parallel to each other in a coordinated manner. As a result, the collision avoidance threshold suitably may be a distance that correlates to a finite amount of time, such as around 1–2 seconds, before a collision with another aircraft within the formation becomes unavoidable. As such, the collision avoidance threshold may be a distance of around 150 feet or so. However, the collision avoidance threshold may be selected as desired for a particular application, depending on factors such as formation mission and resultant station distances, aircraft speed capability, aircraft responsiveness to control surface deflections, aircraft wing span, and the like.

Alternately, for aircraft not flying in the formation, the collision threshold suitably is measured in terms of time before a collision becomes unavoidable. In this scenario, the processor 18 is most likely unaware of any flight plans of any aircraft not flying in the formation. Further, the aircraft and any aircraft outside the formation may be flying at headings at any angle relative to each other and may not be flying parallel to each other. In an extreme case, the aircraft and any aircraft outside the formation may be flying substantially toward each other at around 500 knots each or so. In such an extreme case, the distance that corresponds to 1–2 seconds before collision becomes unavoidable may be on the order of around 1500–3000 feet or so. However, in another extreme case, an aircraft outside the formation may be overtaking from behind the aircraft in the formation. In this other extreme case, the distance that corresponds to 1–2 seconds before collision becomes unavoidable may be on the order of around 100–200 feet or so. Because of this range of possible distances, the collision avoidance threshold suitably is measured in terms of time, such as around 1–2 seconds before collision becomes unavoidable, for aircraft outside the formation. Using well known target-motion-analysis routines, the processor 18 uses input from the sensor 16 and the navigation system 12 to determine whether collision will be unavoidable within a suitable collision avoidance threshold, such as around 1–2 seconds or so.

If the aircraft is determined to be at a threshold that is less than the collision avoidance threshold, then at a block 120 a collision avoidance maneuver is performed. The collision avoidance maneuver is defined as significantly dynamic flight path adjustments made shortly (such as around 1–2 seconds) before a collision becomes unavoidable. As such, the collision avoidance maneuver is a "final safety net" or escape maneuver. Given by way of nonlimiting example, the collision avoidance maneuver may include an escape maneuver such as one aircraft climbing while the other aircraft dives, or one aircraft turning in the opposite direction from the other aircraft, or a combination thereof.

It will be appreciated that the collision avoidance maneuver should not be invoked because collision deconfliction (discussed in detail below) should preclude collision scenarios from developing. However, it is foreseeable that situations can arise where temporary loss of the data link signal 36 or other problems (such as loss of data from the sensor 16) may allow two aircraft to drift too close together. In such a scenario, based on information from another sensor or restoration of the data link 14, the collision avoidance maneuver causes the aircraft to perform an escape maneuver that is optimized to avoid a collision with the other aircraft.

The escape maneuver is continually optimized for any given scenario using an embedded Aircraft Response Model (ARM). The ARM is a model of the aircraft used by a collision avoidance algorithm (or logic) to determine how quickly the aircraft can maneuver, thereby allowing the collision avoidance algorithm to determine when it must activate to avoid a collision. Using the ARM, the collision avoidance algorithm explores a variety of escape maneuvers, and selects the escape maneuver with which it can wait the longest time without activating and still safely avoid the oncoming aircraft. Approximately 1 to 2 seconds before the collision becomes unavoidable, the collision avoidance logic in the processor 18 preempts control of the aircraft and causes the escape maneuver to be performed.

Exemplary collision avoidance logic includes an Automated Air Collision Avoidance System (Auto ACAS) program jointly developed by The Boeing Company, Lockheed Martin, and Saab Aerospace. The Auto ACAS program or other suitable collision avoidance logic is stored in storage 58 and executed by the processor 18. AUTO ACAS has been flight demonstrated by the developing companies and the Swedish and US Governments, and has been proven to successfully prevent collision for a wide variety of collision scenarios.

If the aircraft is determined to be not less than the collision avoidance threshold, then collision avoidance is not performed. Instead, at a decision block 122 a determination is made if the aircraft is at a threshold from the other aircraft that is less than a collision deconfliction threshold. If so, then at a block 124 a collision deconfliction maneuver is performed.

The collision deconfliction maneuver is defined as small flight path adjustments made well before (such as on the order of approximately 30 seconds or so) a collision would occur to keep the aircraft at safe distances from each other. The flight path adjustments of the collision deconfliction maneuver include changing aircraft velocity (such as speeding one aircraft up while slowing the other down) or altitude (such as increasing one aircraft's altitude while reducing the other aircraft's altitude)—or a combination thereof—to maintain desired separation distances between aircraft.

For the reasons set forth above regarding collision avoidance with aircraft not flying in the formation, in a presently preferred embodiment the collision deconfliction threshold suitably is expressed in terms of time regardless of whether the collision to be deconflicted is with an aircraft flying in the formation or outside the formation. As is known, aircraft flying in the formation generally fly parallel to each other. However, the aircraft flying in the formation may also maneuver relative to each other. As a result, distances that correlate to a time of approximately 30 seconds before a collision may span a wide range (as discussed above for avoiding collisions with aircraft flying outside the formation). Accordingly, in a presently preferred embodiment, the collision deconfliction threshold suitably is measured in terms of time (such as, for example, around 30 seconds or so) before a collision.

In addition, in a presently preferred embodiment the collision deconfliction threshold is measured in terms of time because the collision deconfliction maneuver is determined by factors such as a desired magnitude of the maneuver. If the collision deconfliction threshold were expressed as a short distance, magnitude of flight path adjustments may approach those of the escape maneuver used for collision avoidance. Therefore, in order to maintain the collision deconfliction maneuver as a series of small flight path adjustments, in a presently preferred embodiment the collision deconfliction threshold is expressed as a time, such as around 30 mseconds or so, well before a collision. However, it will be appreciated that the collision deconfliction threshold may be selected as desired for a particular application, depending on factors such as formation station distances, aircraft speed capability, aircraft responsiveness to control surface deflections, aircraft wing span, desired magnitude of the maneuver, desired time of execution of the maneuver, and the like.

The collision deconfliction maneuver is performed by transmitting the aircraft's planned flight path over the data link 14, so that dynamic maneuvers, such as turns, can be coordinated throughout the entire formation. As a result, collision deconfliction advantageously allows correcting drift errors between aircraft before the drift errors become flight critical risks.

Exemplary collision deconfliction logic includes an Integrated Tactical Air Combat (ITAC) program developed by The Boeing Company. The ITAC program or other suitable collision avoidance logic is stored in storage 58 and executed by the processor 18. If it is determined at the decision block 122 that the aircraft is greater than the collision deconfliction threshold, then the routine 100 proceeds to the block 116. At the block 116, station keeping adjustment is performed as described above to return the aircraft to its predetermined station.

It will be appreciated that ordering of blocks of the routine 100 is given by way of nonlimiting example. To that end, blocks of the routine 100 may be performed in alternate orders. For example, the decision block 118 may be performed before the decision block 114 or the decision block 112, if desired. Alternately, the block 106 may be performed after or simultaneously with the block 108. Other blocks may be performed in any order as desired for a particular application.

Figure 3:
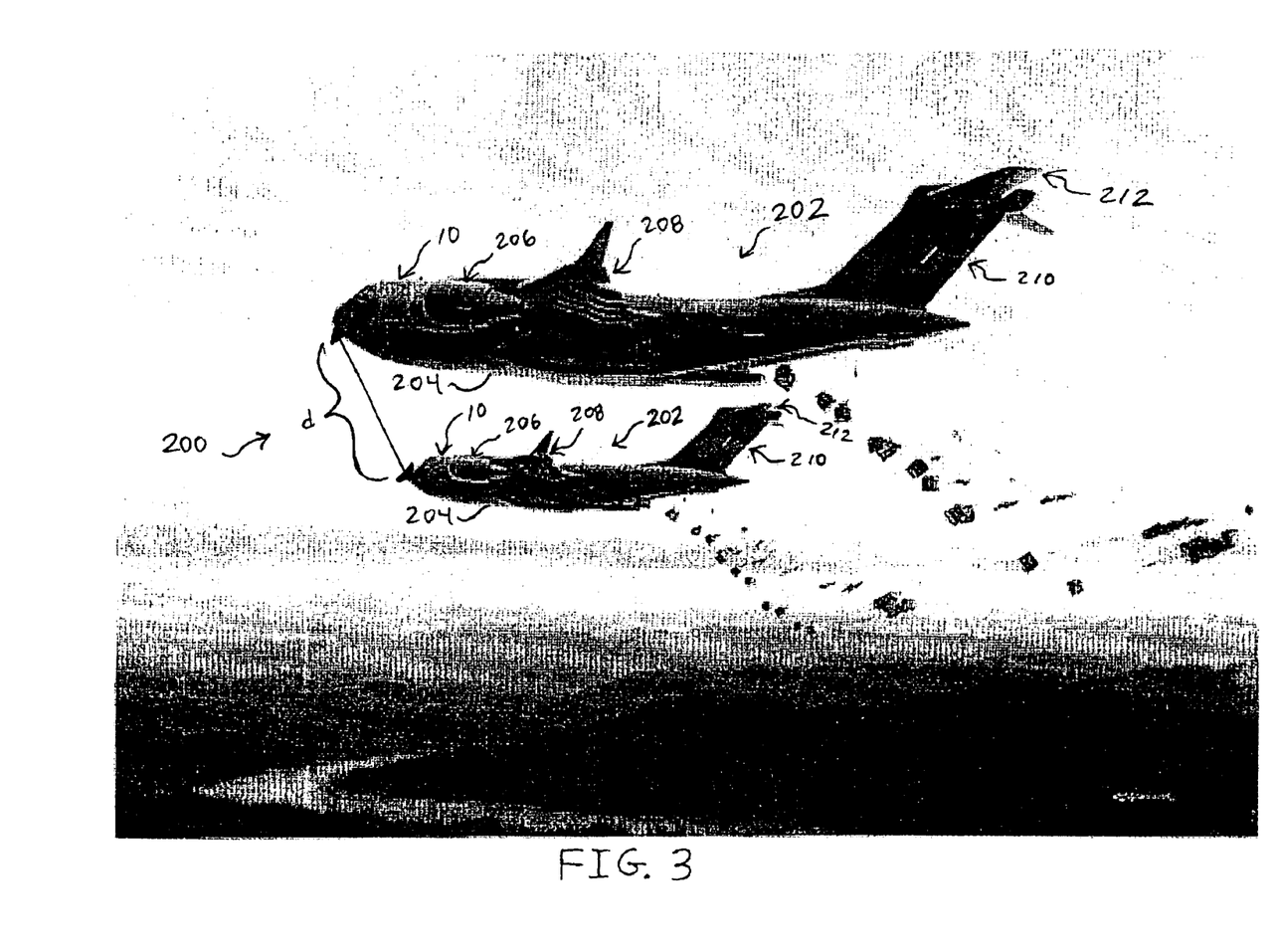
FIG. 3 is a perspective view of a formation flight of aircraft that include the exemplary system of FIG. 1.

Referring now to FIG. 3, a formation 200 is flown by a plurality of aircraft 202 that each include the system 10 (FIG. 1). The aircraft 202 may be any type of aircraft as desired for operational considerations. For example, given by way of nonlimiting example, the aircraft 202 may include the C-17 Globemaster III manufactured by The Boeing Company. As is known, each of the aircraft 202 has a fuselage 204, at least one engine 206, a pair of wings 208, a rudder 210, and control surfaces such as ailerons (not shown) and an elevator 212. Advantageously, the aircraft each include the system 10 (FIG. 1).

The aircraft 202 in the formation 200 each have a station in the formation 200. Given by way of nonlimiting example, the formation 200 may include a line abreast as shown in FIG. 3. However, other formations may be assumed as desired for a particular operation, such as without limitation an echelon, a column, or the like. Furthermore, for sake of clarity, only two of the aircraft 202 are shown in FIG. 3. However, it will be appreciated that the formation 200 may include as many of the aircraft 202 as is desired for operational considerations. When the aircraft 202 are flying in the formation 200, the system 10 enables a predetermined distance d to be maintained between the aircraft 202. That is, the system 10 autonomously maintains the aircraft 202 on station by performing the routine 200 (FIG. 2).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for autonomously keeping an aircraft's station in a formation flight of a plurality of aircraft, the system comprising:

a navigation system configured to determine a position of the aircraft;

a data link configured to allow the aircraft to communicate data with at least one other aircraft in a formation flight of a plurality of aircraft;

a sensor configured to sense position of the at least one other aircraft within a predetermined distance of the aircraft; and a processor configured to provide control signals to keep the aircraft at a predetermined station relative to the at least one other of the plurality of aircraft in the formation flight based upon the sensed position of the at least one other aircraft, the processor including:
  a first component configured to generate first control signals for performing a collision avoidance maneuver when the position of the aircraft is within a first predetermined threshold from the at least one other aircraft in the formation; and
  a second component configured to generate second control signals for performing a collision deconfliction maneuver when the position of the aircraft is within a second predetermined threshold from the at least one other aircraft in the formation, the second predetermined threshold being greater than the first predetermined threshold.

2. The system of claim 1, wherein the navigation system includes an embedded GPS inertial navigation system.

3. The system of claim 2, wherein position uncertainty of the navigation system is within around 30 meters.

4. The system of claim 2, wherein position uncertainty of the navigation system is within around 1 meter.

5. The system of claim 4, wherein the navigation system is configured to process PY GPS signals.

6. The system of claim 1, wherein the data link includes Link 16.

7. The system of claim 1, wherein the data link includes ARC 210 data link.

8. The system of claim 1, wherein the data link includes a millimeter wave radar.

9. The system of claim 1, wherein the data communicated includes a flight plan of the aircraft.

10. The system of claim 1, wherein the sensor includes a millimeter wave radar.

11. The system of claim 10, wherein the predetermined distance is around 10 miles.

12. The system of claim 1, wherein the predetermined station is within around 1,000 feet of at least one other aircraft in the formation.

13. The system of claim 1, wherein the collision avoidance maneuver includes at least one of changing altitude of the aircraft in an opposite direction from changing altitude of the at least one other aircraft and turning away from the at least one other aircraft.

14. The system of claim 1, wherein the first predetermined threshold includes a time period in a range of around 1 second to around 2 seconds before a collision becomes unavoidable.

15. The system of claim 1, wherein the first predetermined threshold includes a distance of around 150 feet.

16. The system of claim 1, wherein the collision deconfliction maneuver includes at least one of changing altitude of the aircraft in an opposite direction from changing altitude of the at least one other aircraft and turning away from the at least one other aircraft and changing speed of the aircraft opposite changing speed of the at least one other aircraft.

17. The system of claim 1, wherein the second predetermined threshold includes a time period of around 30 seconds before a collision becomes unavoidable.

18. A system for autonomously keeping aircraft's station in a formation flight of a plurality of aircraft, the system comprising:
  an embedded GPS inertial navigation system configured to determine a position of the aircraft;
  a data link configured to allow the aircraft to communicate data with at least one other aircraft in a formation flight of a plurality of aircraft;
  a millimeter wave radar system configured to sense position of the at least one other aircraft within a predetermined distance of the aircraft; and
  a processor configured to provide control signals to keep the aircraft at a predetermined station relative to the at least one other of the plurality of aircraft in the formation flight based upon the sensed position of the at least one other aircraft, the processor including:
    a first component configured to generate first control signals for performing a collision avoidance maneuver when the position of the aircraft is within a first predetermined threshold from the at least one other aircraft in the formation; and
    a second component configured to generate second control signals for performing a collision deconfliction maneuver when the position of the aircraft is within a second predetermined threshold from the at least one other aircraft in the formation, the second predetermined threshold being greater than the first predetermined threshold.

19. The system of claim 18, wherein position uncertainty of the navigation system is within around 30 meters.

20. The system of claim 18, wherein position uncertainty of the navigation system is within around 1 meter.

21. The system of claim 18, wherein the navigation system is configured to process PY GPS signals.

22. The system of claim 18, wherein the data link includes Link 16.

23. The system of claim 18, wherein the data link includes ARC 210 data link.

24. The system of claim 18, wherein the data link includes millimeter wave radar.

25. The system of claim 18, wherein the data communicate includes a flight plan of the aircraft.

26. The system of claim 18, wherein the predetermined station is within around 1,000 feet of other aircraft in the formation.

27. The system of claim 18, wherein the predetermined distance is around 10 miles.

28. The system of claim 18, wherein the collision avoidance maneuver includes at least one of changing altitude of the aircraft in an opposite direction from changing altitude of the at least one other aircraft and turning away from the at least one other aircraft.

29. The system of claim 18, wherein the first predetermined threshold includes a time period in a range of around 1 second to around 2 seconds before a collision becomes unavoidable.

30. The system of claim 18, wherein the first predetermined threshold includes a distance of around 150 feet.

31. The system of claim 18, wherein the collision deconfliction maneuver includes at least one of changing altitude of the aircraft in an opposite direction from changing altitude of the at least one other aircraft and turning away from the at least one other aircraft and changing speed of the aircraft opposite changing speed of the at least one other aircraft.

32. The system of claim 18, wherein the second predetermined threshold includes a time period of around 30 seconds before a collision becomes unavoidable.

33. A method of automatically keeping a predetermined station of an aircraft flying in a formation flight of a plurality of aircraft, the method comprising:
  transmitting a flight plan of an aircraft flying in a formation flight of a plurality of aircraft, the aircraft having a predetermined station in the formation flight relative to other aircraft in the formation flight;

determining position of the aircraft;

sensing positions of the other aircraft in the formation;

comparing the position of the aircraft with the positions of the other aircraft in the formation;

automatically adjusting the position of the aircraft relative to positions of the other aircraft flying in the formation flight such that the predetermined station of the aircraft is maintained;

performing a collision avoidance maneuver when the position of the aircraft is within a first predetermined threshold from the other aircraft in the formation; and performing a collision deconfliction maneuver when the position of the aircraft is within a second predetermined threshold from the other aircraft in the formation, the second predetermined threshold being greater than the first predetermined threshold.

34. The method of claim 33, wherein the automatically adjusting the position includes adjusting at least one of course and speed and altitude of the aircraft.

35. The method of claim 33, wherein the predetermined station is at least around 1,000 feet from the other aircraft in the formation.

36. The method of claim 33, wherein the position of the aircraft is determined within a position uncertainty of around 30 meters.

37. The method of claim 33, wherein the position of the aircraft is determined within a position uncertainty of around 1 meter.

38. The method of claim 33, wherein the other aircraft are sensed at distances of at least around 10 miles from the aircraft.

39. The method of claim 33, wherein the performing the collision avoidance maneuver includes at least one of changing altitude of the aircraft in an opposite direction from changing altitude of the other aircraft and turning away from the other aircraft.

40. The method of claim 33, wherein the first predetermined threshold includes a time period in a range of around 1 second to around 2 seconds before a collision becomes unavoidable.

41. The method of claim 33, wherein the first predetermined threshold includes a distance of around 150 feet.

42. The method of claim 33, wherein the performing the collision deconfliction maneuver includes at least one of changing altitude of the aircraft in an opposite direction from changing altitude of the other aircraft and turning away from the other aircraft and changing speed of the aircraft opposite changing speed of the other aircraft.

43. The method of claim 33, wherein the second predetermined threshold includes a time period of around 30 seconds before a collision becomes unavoidable.

44. An aircraft comprising:

a fuselage;

a pair of wings;

a plurality of flight control surfaces;

at least one engine;

an autoflight system; and a system for autonomously keeping the aircraft's station in a formation flight of a plurality of aircraft, the system including:
  a navigation system configured to determine a position of the aircraft;
  a data link configured to allow the aircraft to communicate data with at least one other aircraft in a formation flight of a plurality of aircraft;
  a sensor configured to sense position of the at least one other aircraft within a predetermined distance of the aircraft; and
  a processor configured to provide control signals to the autoflight system to keep the aircraft at a predetermined station relative to the other of the plurality of aircraft in the formation flight based upon the sensed position of the at least one other aircraft, the processor including:
    a first component configured to generate first control signals for performing a collision avoidance maneuver when the position of the aircraft is within a first predetermined threshold from the at least one other aircraft in the formation; and
    a second component configured to generate second control signals for performing a collision deconfliction maneuver when the position of the aircraft is within a second predetermined threshold from the at least one other aircraft in the formation, the second predetermined threshold being greater than the first predetermined threshold.

45. The aircraft of claim 44, wherein the navigation system includes an embedded GPS inertial navigation system.

46. The aircraft of claim 45, wherein position uncertainty of the navigation system is within around 30 meters.

47. The aircraft of claim 45, wherein position uncertainty of the navigation system is within around 1 meter.

48. The aircraft of claim 47, wherein the navigation system is configured to process PY GPS signals.

49. The aircraft of claim 44, wherein the data link includes Link 16.

50. The aircraft of claim 44, wherein the data link includes an ARC 210 data link.

51. The aircraft of claim 44, wherein the data link includes a millimeter wave radar.

52. The aircraft of claim 44, wherein the data communicated includes a flight plan of the aircraft.

53. The aircraft of claim 44, wherein the sensor includes a millimeter wave radar.

54. The aircraft of claim 53, wherein the predetermined distance is around 10 miles.

55. The aircraft of claim 44, wherein the predetermined station is within around 1,000 feet of at least one other aircraft in the formation.

56. The aircraft of claim 44, wherein the collision avoidance maneuver includes at least one of changing altitude of the aircraft in opposite direction from changing altitude of the least one other aircraft and turning away from the at least one other aircraft.

57. The system of claim 44, wherein the first predetermined threshold includes a time period in a range of around 1 second to around 2 seconds before a collision becomes unavoidable.

58. The system of claim 44, wherein the first predetermined threshold includes a distance of around 150 feet.

59. The aircraft of claim 44, wherein the collision deconfliction maneuver includes at least one of changing altitude of the aircraft in an opposite direction from changing altitude of the at least one other aircraft and turning away from the at least one other aircraft and changing speed of the aircraft opposite changing speed of the at least one other aircraft.

60. The aircraft of claim 44, wherein the second predetermined threshold includes a time period of around 30 seconds before a collision becomes unavoidable.

* * * * *